United States Patent [19]

Prince et al.

[11] Patent Number: 4,799,050
[45] Date of Patent: Jan. 17, 1989

[54] FULL COLOR LIQUID CRYSTAL DISPLAY

[75] Inventors: John C. Prince, Kettleby; James F. Farrell, Pickering, both of Canada

[73] Assignee: Litton Systems Canada Limited, Etobicoke, Canada

[21] Appl. No.: 922,186

[22] Filed: Oct. 23, 1986

[51] Int. Cl.⁴ .............................................. G02F 1/13
[52] U.S. Cl. .................................... 340/765; 340/702; 340/784; 350/345
[58] Field of Search ................ 340/702, 784, 765; 313/483, 494, 358; 350/345

[56] References Cited

U.S. PATENT DOCUMENTS

| | | | |
|---|---|---|---|
| 4,104,627 | 4/1978 | Thuler | 340/765 |
| 4,196,973 | 4/1980 | Hochstrate | 350/345 |
| 4,315,258 | 2/1982 | McKnight | 340/765 |
| 4,349,817 | 9/1982 | Hoffman et al. | 350/345 |
| 4,678,285 | 7/1987 | Ohta et al. | 350/345 |

FOREIGN PATENT DOCUMENTS 3434355 6/1986 Fed. Rep. of Germany ...... 340/765

*Primary Examiner*—Howard A. Birmiel
*Attorney, Agent, or Firm*—Elliott N. Kramsky

[57] ABSTRACT

A liquid crystal display provides a high quality color image and efficient energy utilization. A layer of liquid crystal material is controlled by a transparent electrode matrix that is fixed to one surface of a fiber optic plate. A matrix of (primary color emitting) phosphors, each in alignment with a transparent electrode, is fixed to the opposed surface of the plate. A source of fluorescent energy excites the phosphors. A filter located behind the fiber optic plate reflects visible light, both ambient and that emitted from the phosphors. The fiber optic plate acts as a relay lens and prevents cross pixel color contamination while the generation of backlight by the phosphor conversion of fluorescent to visible energy is a highly efficient process.

19 Claims, 2 Drawing Sheets

FULL COLOR LIQUID CRYSTAL DISPLAY

BACKGROUND

1. Field of the Invention

The present invention relates to full color displays. More particularly, this invention pertains to an improved liquid crystal display of the type that is illuminated by both ambient and artificial light.

2. Description of the Prior Art

At present, full color displays for use in aircraft and military vehicles commonly utilize a cathode ray tube (CRT). While such displays provide adequate resolution and brightness, they are relatively bulky, consume much power in operation and often require cooling systems that further contribute to the bulk and the power consumption of the total system. These factors are often of critical importance to the design of airborne systems.

The drawbacks of full color CRT displays have led to investigation of the feasibility of full color displays based, inter alia, upon the use of a layer of electrooptic liquid crystal material. Liquid crystal technology offers the possibility of flat, relatively thin and therefore highly compact construction. Further, the voltages and power levels required to actuate liquid crystal materials to a preferred orientation for modulating incident light are relatively low.

The principal classifications of liquid crystal material are twisted nematic, guest-host (or Heilmeier), phase change guest-host and double layer guest-host. The particular liquid crystal material employed dictates the type of optical modulation that is effected by the light valve. For example, twisted nematic material causes the polarization of the light passing therethrough to become reoriented (usually by ninety degrees). Guest-host materials, so-called by the presence of a dye that aligns itself with the liquid crystal molecules, modulate light as a consequence of the property of the dye to absorb or transmit light in response to the orientation of the molecules of the liquid crystal. In phase change guest-host materials, the molecules of the liquid crystal material are arranged into a spiral form that blocks the majority of the light in the "off" state. The application of a voltage aligns the molecules and permits the passage of light. A double layer guest-host liquid crystal comprises two guest-host liquid crystal cells arranged back-to-back with a ninety degree orientation between the molecular alignment of the two cells.

Liquid crystal displays may be arranged to operate in a transmissive mode, a reflective mode, or both. Generally, the reflective mode is most suitable for operation under high ambient light conditions while the transmissive mode, requiring backlighting, is most usefully employed in applications involving dark and low ambient (e.g. office) lighting conditions. The combination of both modes of operation is known as the "transflective" mode of operation. This mode is particularly-appropriate for broad range operation which includes, of course, many important applications including, for example, the environment of the cockpit.

Presently, liquid crystal displays for operation in the transflective mode comprise a liquid crystal light valve in combination with a source of artificial visible backlighting. A light diffusion plane is located intermediate the light source(s) and the light valve. The optical properties of the plane generally represent a compromise between the needs to (1) transmit artificial backlight and (2) reflect ambient light, when available, through the liquid crystal light valve. The state of the liquid crystal material is spatially controlled by a transparent electrode matrix. (When an active device such as a thin film transistor or "TFT" is incorporated into the array to enhance the addressability of the matrix, it is known as an active matrix display.) Pixel locations are addressed and the molecules of the adjacent liquid crystal material are modulated so that a spatial distribution of pixel areas of preselected varied light transmission is attained. In a full color display, a full color filter that comprises a matrix or mosaic of individual (narrow band) primary color filters provides the sole means for selecting the desired color band of the white light (transmitted backlighting and reflected ambient light) that passes through the liquid crystal material layer. Light absorbing dyes form the (red, green and blue) color elements of the matrix. The color elements of the filter are in registration with the elements of the electrode matrix so that, by addressing the electrodes in accordance with the color coding of the filter matrix, the transmission of white light through the liquid crystal material produces a full color dislay. A representative display of this type is disclosed in U.S. patent Ser. No. 3,840,695 of Fischer for "Liquid Crystal Image Display Panel With Integrated Addressing Circuitry."

Displays in accordance with the above-described typical arrangement are beset with many difficulties. The use of absorbing dye filters to color the image passing through the liquid crystal layer represents a highly inefficient usage of the energy contained in the light source. Each dedicated filter element essentially blocks the transmission of two thirds of the white light through the valve. That is, in the prior art, each pixel is illuminated with white light, requiring that color filters transmit only the desired portion of the white light spectrum while absorbing all other wavelengths. In total, about one third of the energy from the white light source is transmitted through each of the filter "windows".

This energy absorption effect is even more dramatic with respect to the utilization of (reflected) ambient light by the display. Reflected light must pass through the filter twice, multiplying the energy loss. As a result, the display is often unsuitably dim. Correction for such dimness often involves an increase in the power level of the backlighting that, in turn, introduces additional undesirable effects. In addition to conflicting with the goal of a low energy display, this may produce harmful temperature rises within the system.

The design of a single filter for coloring both backlight and ambient illumination is further complicated by the different chromaticity effects experienced by the reflected light which passes twice through the filter and the transmitted light that passes only once through that filter. This disparity can result in a display of differing hues during high and low ambient lighting conditions.

Another deficiency of the conventional approach is that, in the desire to minimize undesirable parallax effects, the color filter elements must be closely located immediately adjacent the liquid crystal layer. Thus, the diffusion (or back) plane, which must be behind the liquid crystal layer, is recessed by the thickness of the glass layer at the rear of the liquid crystal. The resultant spacing of the filter and the somewhat-reflective backplane can produce two deleterious effects during reflective mode operation of the display. Ambient light will generally include off-axis rays. When ambient light is absorbed in the liquid crystal layer, it creates a shadow on the diffusing plane along the axis of the incident light. Therefore, as the display is viewed at an angle with respect the direction of such incident light, the image appears to be displaced with respect to the image created in the liquid crystal layer. This results in an annoying double image or "shadowing" effect. Of perhaps even greater significance, the spacing of the backplane from the color matrix can produce cross-contamination between the primary colors of the filter. This results when an oblique, off-axis ray of ambient light passes through a filter of one primary color when incident upon the front of the light valve and then exits the valve through a filter of a second primary color after reflection from the backplane.

SUMMARY

The present invention overcomes the above-referenced shortcomings of the prior art by providing a novel display. In a first aspect, the display of the invention includes a layer of light modulating member. Means are provided for applying a plurality of spatially-distributed voltage values to the member whereby a pattern of contrasting brightness is generated therein. A phosphor layer and means for exciting the layer to emit light are provided. The phosphor layer is arranged so that the intensity of the light emitted is modulated by the pattern of light transmissive areas of the layer of light modulating member.

In a further aspect, there is provided a combination that includes a light modulating member. Means are provided for applying a plurality of spatially-distributed voltage values to such member whereby a pattern of contrasting brightness is generated within the light modulating member. Means are further provided for transmitting visible light through the member. Finally, a fiber optic plate is located intermediate the means for transmitting visible light and the layer of light modulating member whereby the visible light is relayed to a surface of the light modulating member.

The preceding and other advantages and features of this invention will become further apparent from the detailed description that follows. This written description is accompanied by a set of drawing figures that include numerals thereon corresponding to reference numerals of the description. Such numerals point out the various features of the invention, like numerals referring to like features of the invention throughout.

DESCRIPTION

Figure 1:
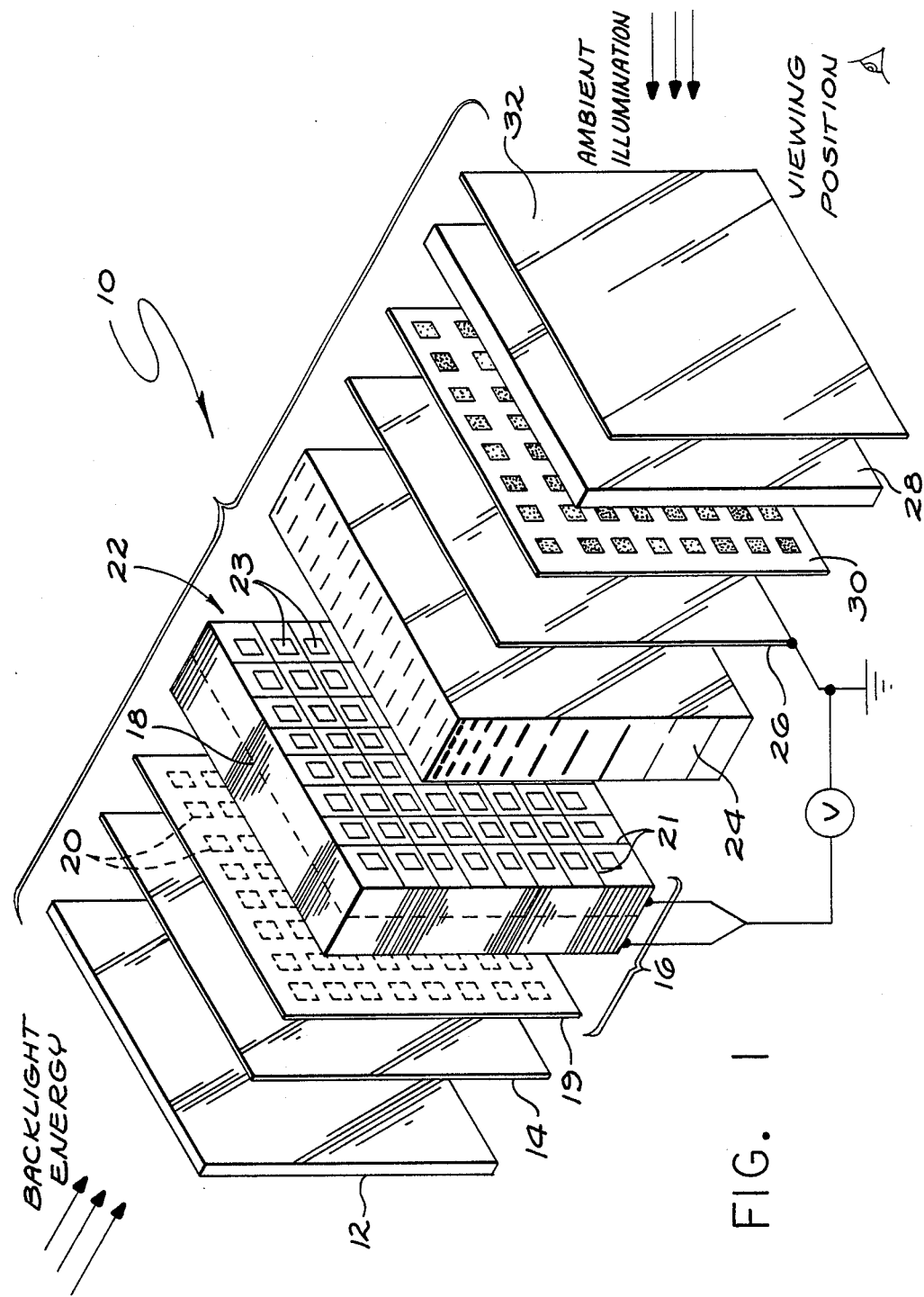
FIG. 1 is an exploded perspective view of the arrangement of a light valve for use in a full color display in accordance with the invention.

Turning now to the drawings, FIG. 1 is an exploded perspective view of a light valve 10 for use in a full color liquid crystal display in accordance with this invention. Some of the details of construction of the light valve 10 have been omitted for purposes of clarity from the representation of FIG. 1. However, it will be appreciated by those skilled in the art that such omitted details relate to matters that are well known in the art.

The description of the structure of the light valve of FIG. 1 will proceed from its rear or backside which accepts the output from one or more sources of ultraviolet radiation to the front surface through which ambient illumination enters the cell. A plate 12 forms the rear surface of the light valve 10. The plate 12, preferably quartz, transmits ultraviolet radiation. A first dichroic selective filter layer 14 is deposited on the inner surface of the plate 12. The dichroic filter 14 is fabricated of material that is transmissive to ultraviolet radiation and reflects visible light. The significance of such arrangement will become further apparent from the discussion of the invention that accompanies FIG. 2.

A unique fiber optic plate structure 16 is located adjacent the filter layer 14 of the plate 12. This structure 16 includes a fiber optic plate 18 of about 0.05 inches in thickness having distinct structures, in registration, at its opposed surfaces. At the rear or backside of the plate 18, is a second dichroic filter 19. The dichroic filter 19, shown and discussed further in conjunction wth FIG. 2, differs from the first dichroic filter 14 in that it is fabricated of material that reflects ultraviolet and transmits visible radiation. A phosphor layer 20 is deposited onto the surface of the filter 19. The layer 20 may comprise a matrix arrangement of a plurality of discrete phosphor elements. (The term "phosphor", as used herein, includes any material that converts energy from an external excitation and, by means of the phenomenon of phosphorescence or fluorescence, converts such energy into visible light.)

In such a matrix, each phosphor element is aligned in registration with a corresponding elements of the electrode pattern 23. The matrix may contain a single type (i.e. wavelength emission spectrum) of phosphor or a plurality of phosphor types for providing a multi-color display. In the case of a full color display, a plurality of phosphors, each of which emits one of the primary colors upon excitation by ultraviolet radiation, is preferably arranged into a recognized format. This may include, for example, the conventional triad, quad (in which the green component is doubled) or fixed format geometries. The phosphors may be deposited by any of a number of well known processes including settling, screen printing and photolithography. These processes are also commonly employed in the fabrication of CRT screens.

As an additional feature, each of the plurality of phosphors 20 may be colored (body color) such that the chromaticity of the reflectance spectrum closely matches that of the phosphor's emission spectrum. The purpose of such pigmentation is to prevent the "washing out" or other introduction of color impurity into the image emitted by the excited phosphors. This can occur in the presence of high ambient illumination by the superposition of the color reflected from the surfaces of the phosphors.

An active electrode matrix 22 comprising metallized buses and transparent electrodes 23 is formed on the front of the fiber optic plate 18. The arrangement and fabrication of such an electrode matrix for spatially distributing a plurality of liquid crystal level voltages is well known in the art and is disclosed, for example, in the Fischer patent referenced above. Generally, such a structure may be formed by vacuum deposition of metallized electrodes. Dielectric inter-layers are provided for necessary insulation. The electrode matrix 22 is preferably an "active" matrix that associates a semiconductor device (transistor or diode) with each node of the bus structure. Such active electrode arrays facilitate the addressing of large element arrays.

The phosphor and active electrode matrices are aligned by well known techniques. By forming both of these critical devices onto a common material, the registration of corresponding elements of the two matrices is maintained and is not affected by differential temperature expansions. The fiber optic plate 18 may comprise two independent plate elements to facilitate the two quite different (electrode and phosphor matrix) fabrication processes necessarily undertaken with respect to its front and rear faces.

A layer of liquid crystal material 24 is positioned adjacent the front surface of the fiber optic structure 16 in intimate contact with the active electrode matrix 22 formed at the front surface of the plate 18. This layer is preferably formed of guest-host (Heilmeier) liquid crystal material as this material is known to have a good gray-level characteristic (i.e. linearity of the voltage-light transmission relationship). However, phase change guest-host material is equally compatible with the geometry of the invention. The general arrangement of the invention is further compatible with the additional structural layers required to accommodate double layer guest host liquid crystal material.

A layer 26 of transparent conductive material such as ITO (indium tin oxide) is located at the front surface of the liquid crystal 24 and is generally maintained at a reference potential with respect to the address and data voltages applied to the active matrix. The layer 26 acts as an equipotential surface that provides the common or counterelectrode of the display.

The layer 26 coats the interior surface of the color filter 30. The front plate 28 admits ambient light into the light valve 10 from the environment and transmits the visible light emitted by the phosphors 20 and reflected from surfaces of the phosphors and the first filter 14 and then transmitted through the liquid crystal layer 24. The plate 28 is preferably fabricated of glass having a coefficient of thermal expansion which closely matches that of the fiber optic plate 18. Such matching of coefficients minimizes stressing of the required hermetic seal (not illustrated) between the window layer 28 and the fiber optic plate 18. Such a hermetic seal prevents both leakage and contamination of the liquid crystal material 24.

A color filter 30 may be optionally deposited onto the front plate 28. The filter 30, comprising a matrix of light absorbing dyes (each in registration with a like-colored phosphor of the matrix 20), provides an alternative to body coloring the phosphors to prevent the image washout at high ambient illumination that could otherwise occur. While the arrangement of dye elements of the filter 30 and its principle of operation are the same as that of a color filter of the type that is commonly employed on prior art liquid crystal displays, the filter 30 is qualitatively different in both structure and operation in that its individual filter elements are not as wavelength selective as those of the filters of prior art full color displays. This is a result of the fact that, in the liquid crystal display system of the invention, the filter 30 is not the sole available means for coloring the output image. Rather, as will be seen from the discussion that accompanies FIG. 2, the primary sources of colored light for the display are the visible colored light emissions of the excited phosphors 20.

The visible light emissions of colored light from the phosphors generally have a narrow bandwidth and exhibit well saturated chromaticity that is similar in performance to the outputs from the cathode luminescent phosphors used in color CRT's. The outputs from the phosphors are necessarily superimposed upon the color filter elements that are illuminated by reflected ambient light. Thus, the filter 30 needn't have the same selectivity as the light absorbing filters of prior art liquid crystal displays that rely solely upon a dye filter to color the ouput image. As a result, the design of the filter 30, as opposed to filters for prior art liquid crystal displays, is of a lesser wavelength selectivity, features a much wider passband, and may be employed with a correspondingly reduced effect in terms of its absorption of the energy input (both natural and artificial) to the display. A much higher percentage of white light is transmitted through the absorbing filter 30 of the display of the invention than is transmitted through the type of filter that is commonly employed in prior art liquid crystal displays. The effect of the increase transmissivity of the filter 30 becomes even more pronounced in the reflective mode as reflected ambient light passes through the filter 30 twice (upon both incidence and reflection).

The final element of the light valve 10 is an optional polarizer 32. This polarizer is required for operation of the display when a guest-host (Heilmeier) type material is employed for the liquid crystal layer 24 but would be unnecessary in a display that utilizes a phase change guest-host material. This reflects the differing modes of physical operation of these two types of liquid crystal materials.

Figure 2:
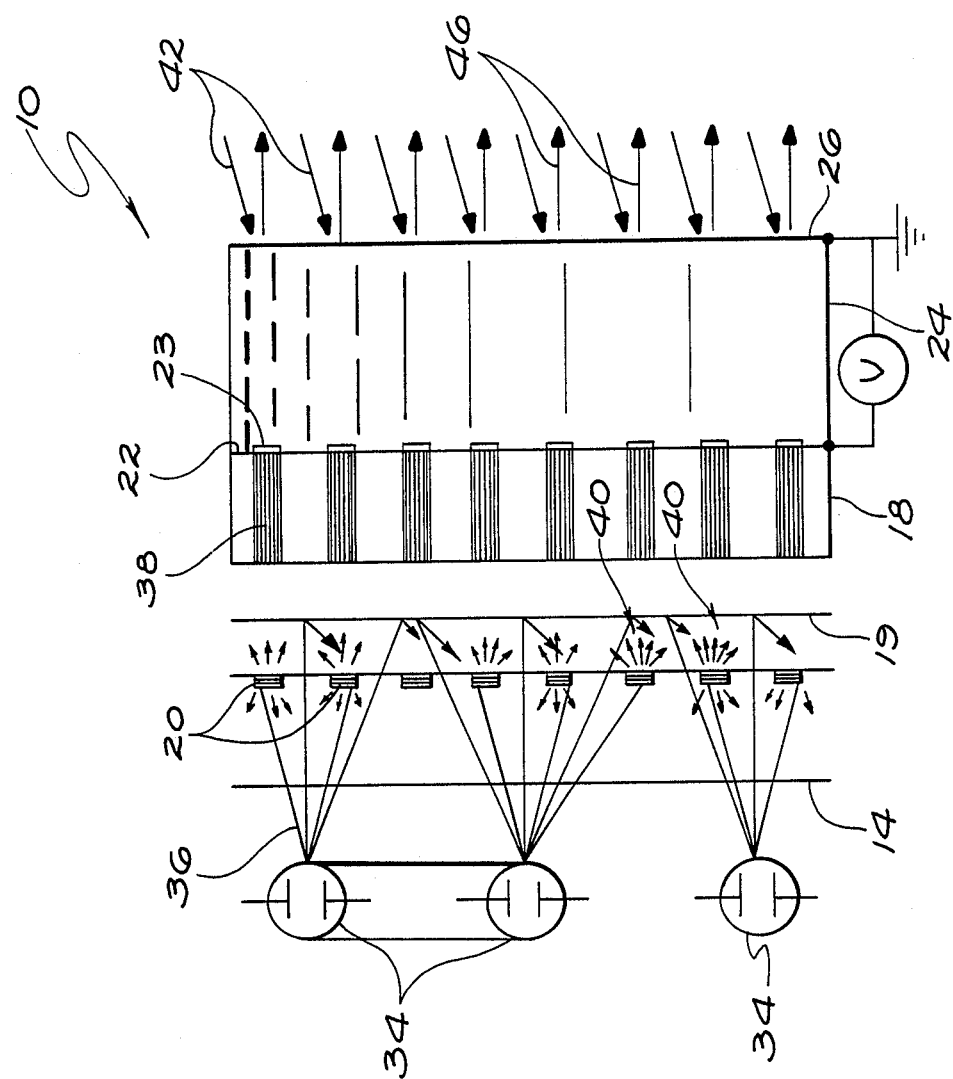
FIG. 2 is a schematic side view of a full color liquid crystal display in accordance with this invention that serves to illustrate its operation.

FIG. 2 is a partial side view of a liquid crystal display arrangement in accordance with the invention. Certain elements of the light valve 10 of FIG. 1 have been omitted and others are shown somewhat schematically in this figure to assist in the accompanying discussion.

A fluorescent lamp 34 is positioned at the backplane of the light valve 10. The electrodes of the lamp 34 are enclosed within a clear envelope of quartz or other ultraviolet-transmissive material. Thus, the output of the lamp 34 comprises ultraviolet radiation 36 rather than visible light. As will become apparent from the discussion that follows, the output of the lamp 34 is chosen for its ability to excite the phosphor matrix 20 to emit visible light. In general, the dominant emission spectrum of the lamp 34 is between 254 nm and 365 nm. This spectrum is, of course, selected so as to match the excitation spectrum of the phosphors. Other energy sources, including electron beams are known to excite phosphors to emit visible light and may be substituted for the fluorescent lamp 34.

The invention utilizes the intrinsically high energy conversion efficiency (visible light emitted per unit of energy applied) of flourescent illumination. Whereas an incandescent lamp exhibits an overall efficiency of approximately 15 lumens per watt, the efficiency of flourescent illumination exceeds 50 lumens per watt. Unlike prior art systems that have sometimes utilized flourescent lamps as a source of visible white light that is thereafter colored by means of lossy filters, the present invention obtains the maximum available energy efficiency offered by the utilization of flourescent energy.

The ultraviolet radiation 36 from the lamp 34 is transmitted through the first dichroic filter 14 prior to reaching the phosphor matrix 20. As the radiation 36 reaches the phosphors of the matrix 20, the ultraviolet radiation is, in turn, converted to colored visible light at a relatively high efficiency (in excess of eighty per cent). This is to be contrasted to the prior art wherein the generation of colored light is quite inefficient due to the high absorption of the visible white light by a narrowband dye filter. In such a prior art system, about thirty per cent of the incident energy is transmitted. The actual amount of transmission achieved is dependent upon the bandwidth of the filter. Well saturated, or narrow bandwidth, colors can only be realized at the expense of increased selectivity and consequent additional energy loss.

The ultraviolet radiaton 36 that is not initially absorbed by the phosphors 20 is reflected from the second filter 19 and may thereafter be absorbed by the phosphors, further increasing the efficiency of the system.

The visible colored light 40 emitted by the phosphors is radiated toward both the front and the back of the light valve 10. Due to the visible light reflectivity of the dichroic filter 14, the phosphor emissions that travel toward the backside of the light valve 10 are reflected therefrom and toward the front of the display. The close spacing between the phosphor matrix 20 and the adjacent dichroic filter 14 allows only minimal "spreading" of the reflected phosphor outputs. Thus, a high percentage of this reflected light is available for illumination of the display after travelling through the light "pipes" of the fiber optic plate 18 and the transmissive portions of the liquid crystal layer 24.

The dichroic filter 14 additionally reflects the incoming ambient light. The portion of ambient light reaching the filter 14 represents the residue of the incoming light that is incident upon the diffusing surfaces of the phosphors 20. As mentioned earlier the effect of that light insofar as reducing the purity of the backlit image produced by the display is corrected by either the coloring of the phosphor bodies to match their emission spectra or the addition of the optional dilute color filter matrix 30 at the front of the light valve 10.

The ambient light 42 enters the valve 10 through the front plate 28, polarizer 32 (in the event that a Heilmeier liquid crystal material is utilized) and (optionally), the dilute filter 30. (These elements of the light valve are not shown in FIG. 2). After passing through the transparent counterelectrode 26 and the lightmodulating layer of liquid crystal material 24, it reaches the fiber optic plate 18. As mentioned earlier, the active electrode matrix 22 comprising a conventional array of busses and transparent drive electrodes 23, in registration with the phosphor matrix at the back of the plate 18, is located on the front surface of the plate 18.

As can be seen from FIG. 2, the optical fibers of the plate 18 can be thought of as grouped into a plurality of "pipes" 38 for transmitting light therethrough. Each pipe 38 underlies a single phsophor 20 of the matrix and, due to the registration of the phosphor and electrode matrices, transfers light toward the associated transparent electrode 23 on the opposed face of the fiber optic plate 18. Each of the phosphors of the matrix 20 corresponds to a single pixel of the display, each pixel being about 0.010 inches square. Between 50 and 100 optical fibers of the plate 18 comprise an individual light pipe 36 for transferring the full color illumination of the phosphor matrix 20 to the front surface of the plate 18, adjacent the layer of liquid crystal material 24. The individual phosphor dimensions match those of the electrode matrix and a typical display panel will include approximately 250,000 to 1,000,000 phosphor elements or pixels. Visible light that is incident at either surface of the plate 18 will be transmitted through a pipe 38 comprising a plurality of adjacent optical fibers. The image is dissected by the individual optical fibers of the plate 18 and the total image is transferred through the individual optical fibers without significant dispersion. Thus, the plate acts as a relay lens, transferring the image plane of the phosphors to close proximity to the liquid crystal layer.

In the event that the phosphors of the matrix 20 are not colored and the optional filter matrix 30 is utilized, the above-described process whereby off-axis incident illumination is screened by the fiber optic plate 18 similarly prevents cross-contamination of the colors of the display and assures that the ambient illumination will enhance the color quality of the image. As mentioned above, the colored windows of the filter 30 are aligned with the matching color-emitting phosphors of the matrix 20. By locating the fiber optic plate 18 intermediate the filter 30 and the phosphors 20, the ambient light that is incident upon the phosphors is required to travel and exit through the particular color filter that is in registration with the phosphor of the identical light emitting color. The particular light path for a given phosphor-filter combination is, of course shuttered (for off, on and gray-level light transmission) by the alignment of the molecules of the liquid crystal layer 24. Thus, ambient light is reflected only off the phosphors that have been shuttered on the liquid crystal layer 24.

Thus it is seen that there has been provided a new liquid crystal display of the type that is illuminated by both ambient and artificial light energy. As such, the display is operable in the transflective mode. Although reference has been made to liquid crystal light valve material, it should be understood that other known types of light valves or modulators may be adapted to the present invention. Examples of such alternatives include suspensions of polarizing particles in a host of liquid, magneto-optical light modulators that utilize the Faraday effect and piezoelectric light modulators.

By utilizing a display in accordance with the teachings of the invention, one can realize much higher efficiencies in the utilization of input energy. This beneficial result derives, in part, from a combination of the generally low power requirements for modulating liquid crystal material (as opposed to CRT technology) coupled wth a design that features the efficient energy transformations that are inherent in the use of ultraviolet radiation to excite phosphorescent material to narrow band emissions of visible light.

While this invention has been described with respect to its presently preferred embodiment, its scope is not so limited. Rather, the scope of this invention is only limited insofar as defined in the following set of claims and includes all equivalents thereof.

What is claimed is:

1. A display comprising, in combination:
   (a) a plurality of adjacent light-conducting cells disposed in a planar array, each said cell having means associated with it for modulating the amount of visible light passing therethrough;
   (b) a phosphor layer behind said cell array, said layer being capable of emitting visible light through said array when irradiated from behind with ultraviolet light;
   (c) an ultraviolet light source behind said phosphor layer for irradiating said phosphor layer with ultraviolet light; and
   (d) a fiber optic plate disposed behind said cell array and in front of said phosphor layer, said plate including a plurality of adjacent and parallel light-conducting pipes, each said pipe comprising a bundle of optical fibers and having a front end in light-conducting communication with one of said cells, and a rear end in light-conducting communication with said phosphor layer.

2. The display of claim 1 further including:
(a) a first filter means behind said phosphor layer and in front of said ultraviolet light source for transmitting ultraviolet light to said phosphor layer and for reflecting visible ambient light incident thereon; and
(b) a second filter means in front of said phosphor layer and behind said plate for transmitting visible ambient light to said phosphor layer and for reflecting ultraviolet light incident thereon.

3. The display of claim 2, wherein said phosphor layer further comprises:
(a) a planar matrix of discrete phosphor elements, each said element being in light-conducting communication with a rear end of one of said pipes.

4. The display of claim 3, wherein adjacent ones of said phosphor elements are distributed into adjacent groups of said elements, and wherein the emission spectra of the elements of each said group differ from each other such that the color of light emitted from each said group can be adjusted through the full spectrum of visible color.

5. The display of claim 4, wherein each said phosphor element is colored such that the color of light reflected by it closely matches that of its emitted spectrum.

6. The display of claim 4, further comprising a dilute color filter in front of said array, said filter comprising a planar matrix of light-absorbing, wide-passband dye elements, each said dye element being in alignment with a like-colored one of said phosphor elements through one of said pipes.

7. The display of claim 2, wherein said second filter means further comprises a layer formed directly on a back face of said fiber optic plate, and wherein said phosphor layer is deposited directly on said layer.

8. The display of claim 3, wherein said second filter means further comprises a layer formed directly on a back face of said fiber optic plate, and wherein said matrix of phosphor elements is deposited directly on said layer.

9. The display of claim 8, wherein said array of light-conducting cells further comprises:
(a) a layer of liquid-crystal material on a front face of said fiber optic plate; and
(b) a planar array of transparent control electrodes deposited directly on said front face of said plate, each said electrode being aligned with one of said phosphor elements through one of said pipes in said plate and defining a corresponding one of said light-conducting cells in said liquid-crystal layer.

10. The display of claim 9, wherein said fiber optic plate further comprises two independent fiber optic plates assembled back-to-back.

11. The display of claim 9, wherein said liquid crystal layer is a guest-host (Heilmeier-type) material and further comprising a polarizing layer in front of said liquid crystal layer.

12. A display comprising, in combination:
(a) a light-conducting plate having front and rear faces and a plurality of adjacent and parallel optical-fiber light pipes extending between said faces, each said pipe comprising a bundle of optical fibers;
(b) a filter layer formed directly on said rear face of said plate;
(c) a matrix of distinct phosphor elements deposited directly on said filter layer, each said element being in registration with a rear end of one of said light pipes and capable of emitting visible light therethrough when illuminated by flourescent light;
(d) an array of distinct transparent control electrodes deposited directly on said front face of said plate, each said electrode being in aligned registration with one of said phosphor elements through a front end of one of said pipes;
(e) a source of flourescent light behind said plate for illuminating each said phosphor element with flourescent light; and
(g) a layer of liquid crystal material adjacent to said electrodes on said front face of said plate, said layer and said electrodes having means associated therewith for defining an array of light-conducting cells in registration with said pipes and for modulating the amount of light passing through corresponding ones of said cells and said pipes.

13. This display of claim 12 further including:
(a) said filter layer is a dichroic filter capable of transmitting visible light and reflecting fluorescent light; and
(b) filter means between said source and said plate for transmitting fluorescent light from said source and for reflecting visible ambient light thereon.

14. The display of claim 13, wherein adjacent ones of said phosphor elements are distributed into adjacent groups of said elements, and wherein the emission spectra of the elements of each said group differ from each other such that the color of visible light emitted from each said group can be adjusted through the full spectrum of visible color.

15. The display of claim 14, wherein each said phosphor element is colored such that the color of visible light reflected by it closely matches that of its emitted spectrum.

16. The display of claim 14, further comprising a dilute color filter in front of said layer, said filter comprising a planar matrix of light-absorbing, wide-passband dye elements, each said dye element being in alignment with a like-colored one of said phosphor elements.

17. The display of claim 16, further comprising a transparent reference electrode deposited of a rear face of said color filter and in close proximity to a front face of said liquid crystal layer.

18. The display of claim 13, wherein said fiber optic plate further comprises two independent fiber optic plates assembled back-to-back.

19. The display of claim 13, wherein said liquid crystal layer is a guest-host (Heilmeier-type) material and further comprising a polarizing layer in front of said liquid crystal layer.

* * * * *